United States Patent [19]

Chen

[11] Patent Number: 5,094,875
[45] Date of Patent: Mar. 10, 1992

[54] CONTINUOUS METHOD OF TOFU PRODUCTION

[76] Inventor: Lu-ao Chen, 2122 Commenwealth Ave., Auburndale, Mass. 02166

[21] Appl. No.: 496,126

[22] Filed: Mar. 19, 1990

Related U.S. Application Data

[63] Continuation of Ser. No. 110,553, Oct. 19, 1987, abandoned, which is a continuation of Ser. No. 771,362, Aug. 30, 1985, abandoned.

[51] Int. Cl.$^5$ .............................. A23J 3/00; A23L 1/00
[52] U.S. Cl. ........................................ 426/634; 426/521
[58] Field of Search ........................ 426/634, 521, 518

[56] References Cited

U.S. PATENT DOCUMENTS

| | | | |
|---|---|---|---|
| 4,140,811 | 2/1979 | Ogasa et al. | 426/634 |
| 4,514,433 | 4/1985 | Matsuura | 426/634 |

FOREIGN PATENT DOCUMENTS

| | | | |
|---|---|---|---|
| 59-88058 | 5/1984 | Japan | 426/634 |
| 59-39105 | 9/1984 | Japan | 426/634 |
| 59-198952 | 11/1984 | Japan | 426/634 |
| 60-224462 | 11/1985 | Japan | 426/634 |
| 60-227650 | 11/1985 | Japan | 426/634 |
| 62-118858 | 5/1987 | Japan | 426/634 |

*Primary Examiner*—George Yeung
*Attorney, Agent, or Firm*—Robert L. Goldberg; Peter F. Corless

[57] ABSTRACT

A method of tofu production, in one aspect comprising steps of simultaneously feeding soymilk and an aqueous coagulant solution into a coagulator vessel whereby a substantially constant proportion of the soymilk and coagulant are added to the vessel; coagulating the soymilk and aqueous coaqulant solution at an elevated temperature to obtain a gelatinous mixture comprising soybean curd lumps and whey; prior to substantial cooling of the gelatinous mixture after coagulation, separating at least a portion of the whey from the gelatinous mixture. The present invention is particularly useful for a continuous method of tofu production.

9 Claims, 13 Drawing Sheets

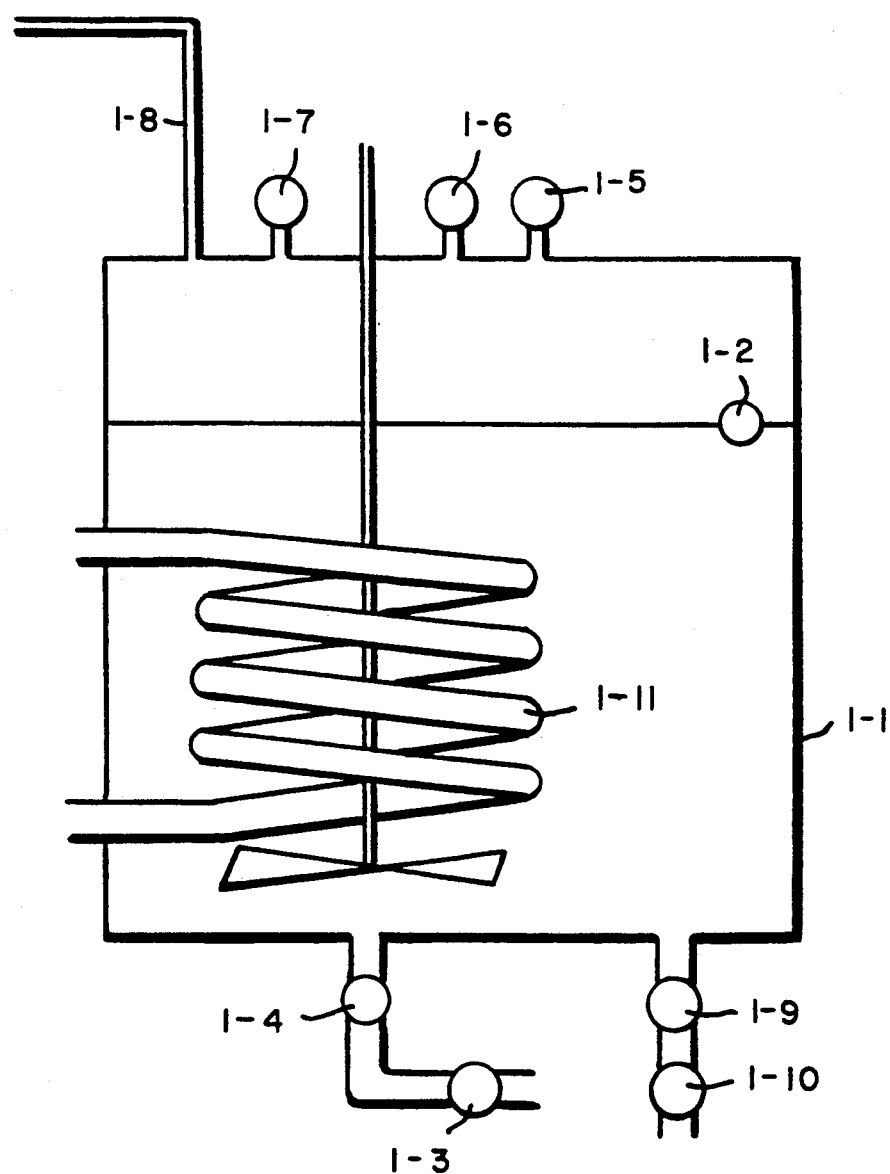
FIG. 1 (P.5)

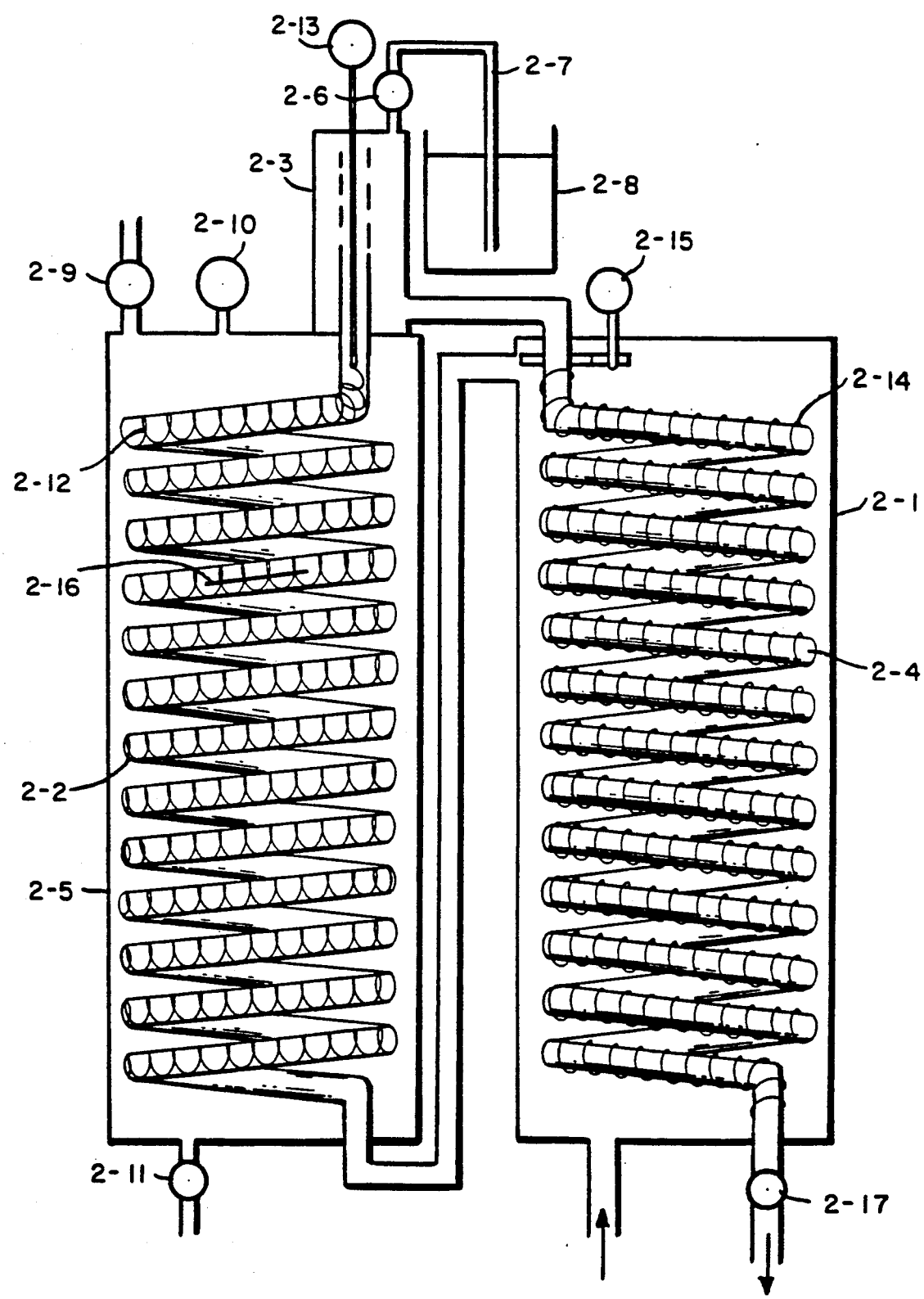
FIG. 2 (P.6)

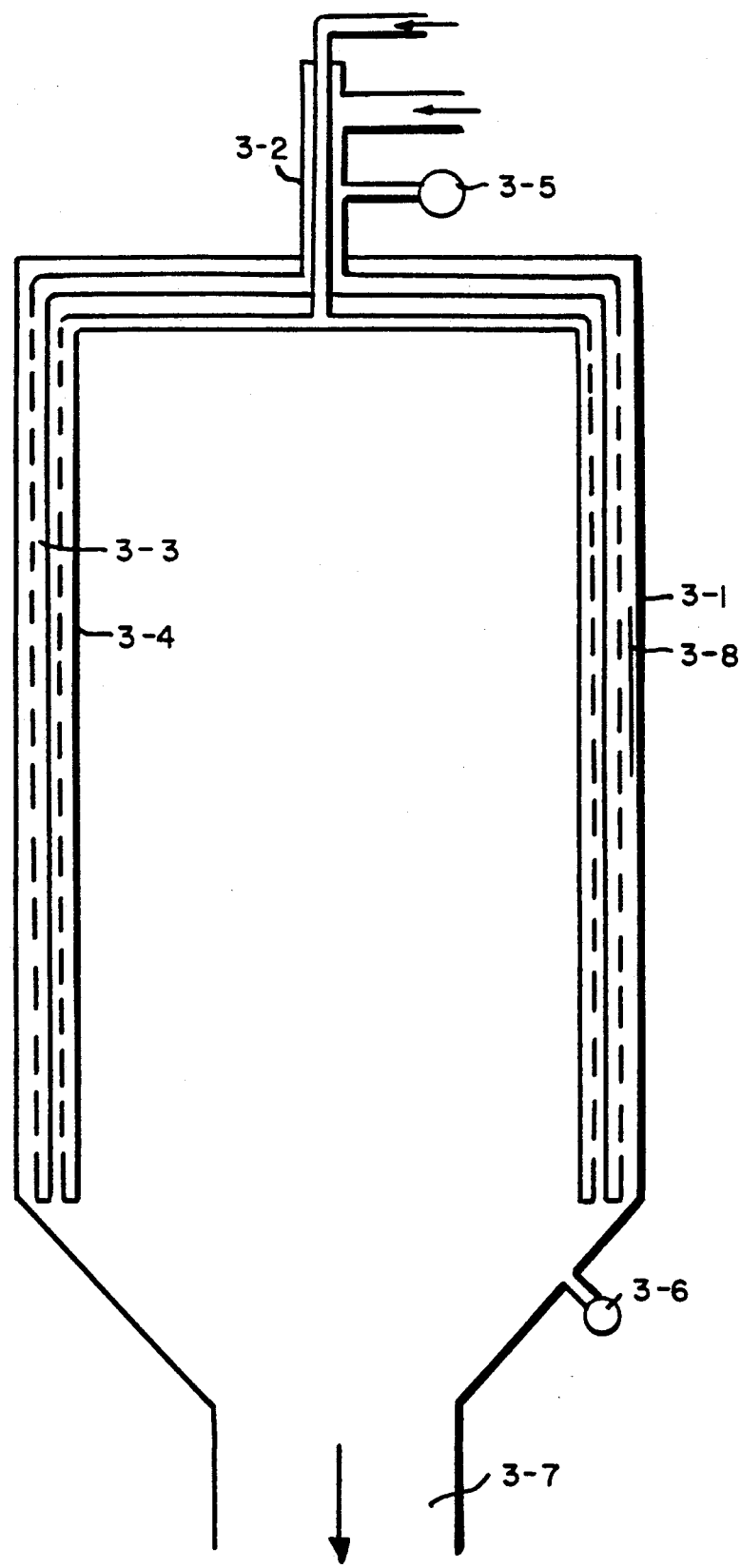
FIG.3 (P.6)

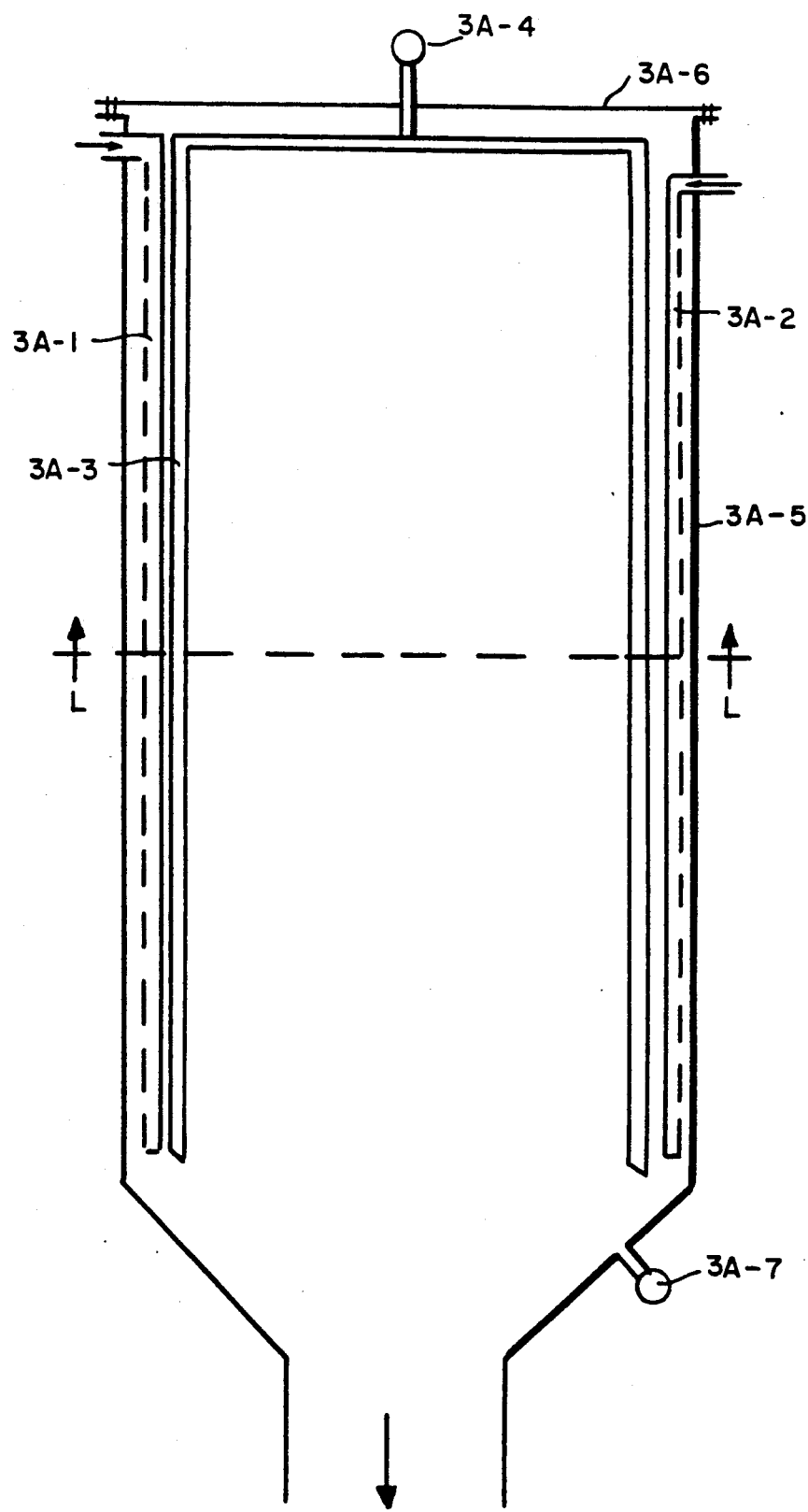
FIG.3A (P.7)

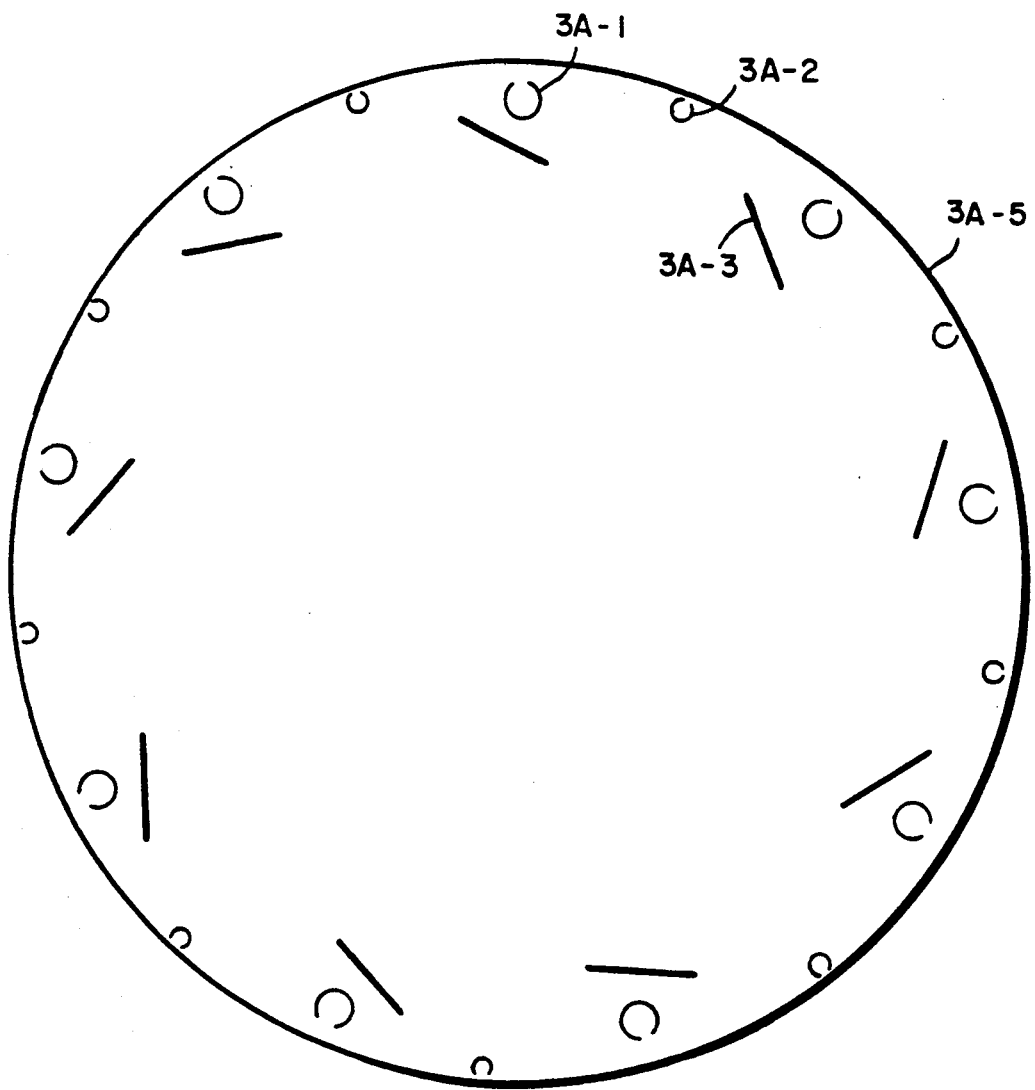
FIG. 3B (P.7)

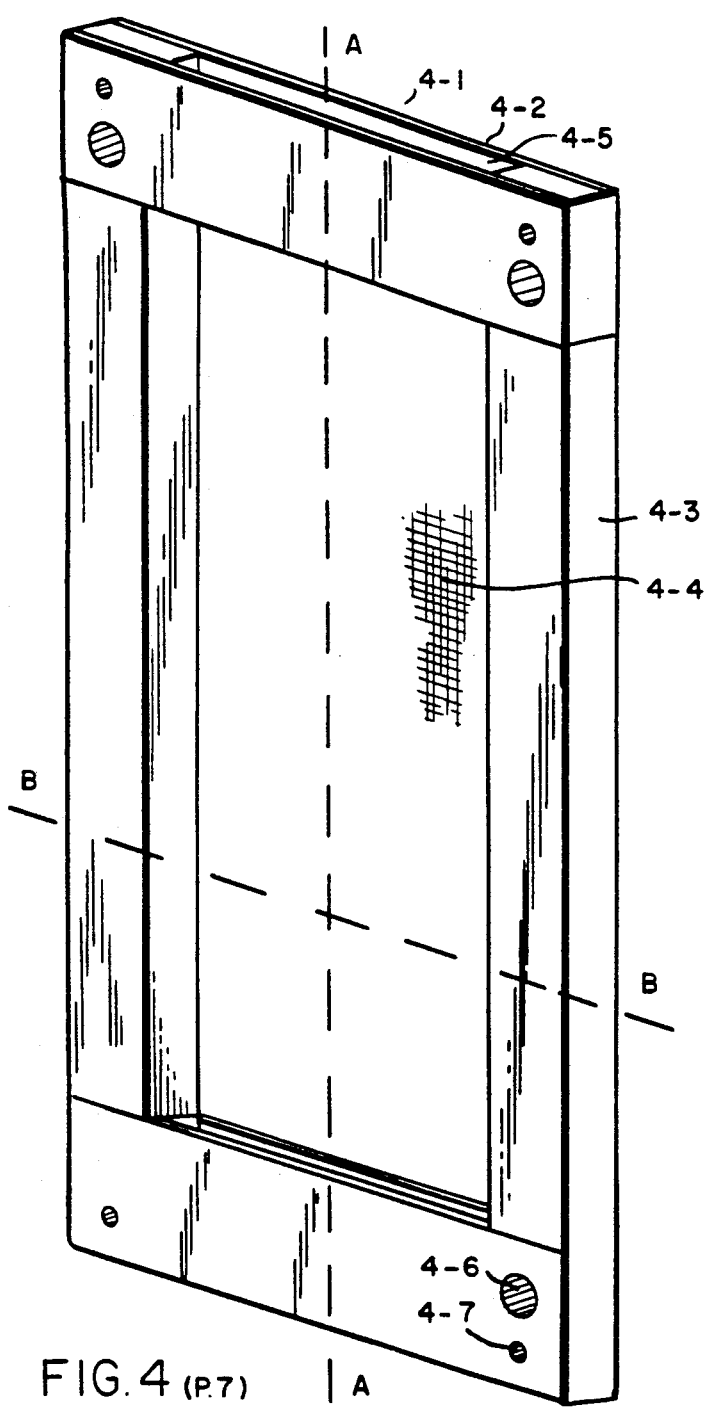
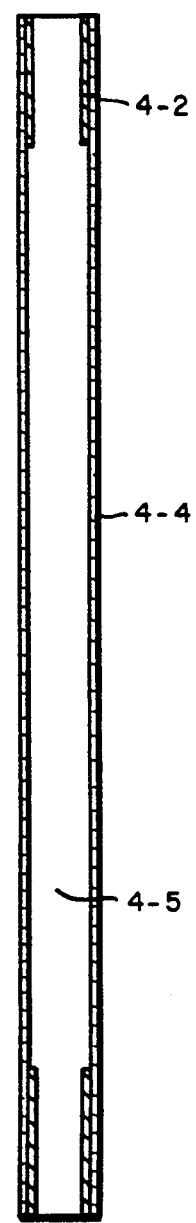
FIG. 4 (P.7)  FIG. 4A (P.8)
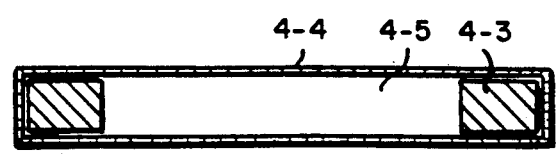
FIG. 4B (P.8)

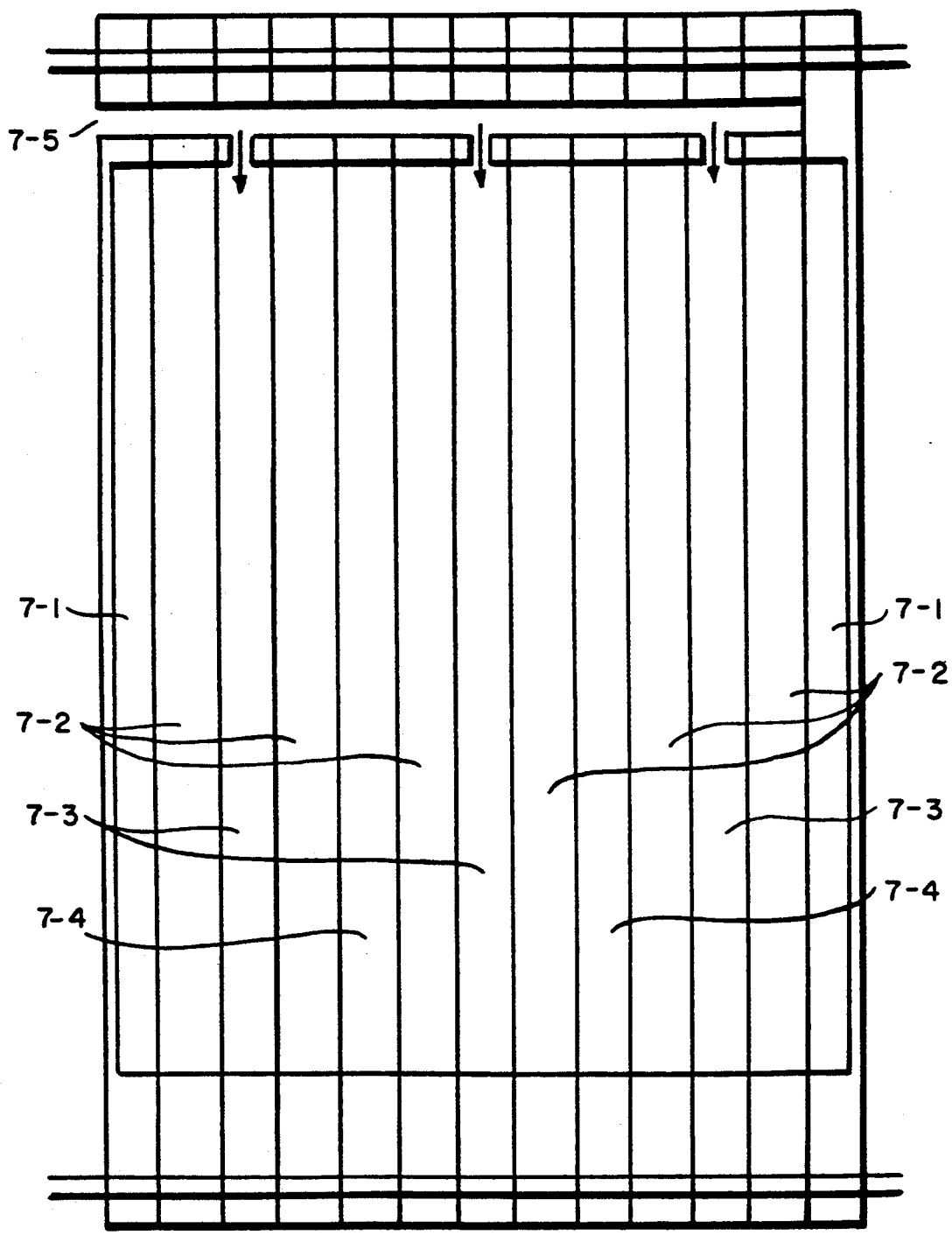
FIG. 7(P.8)

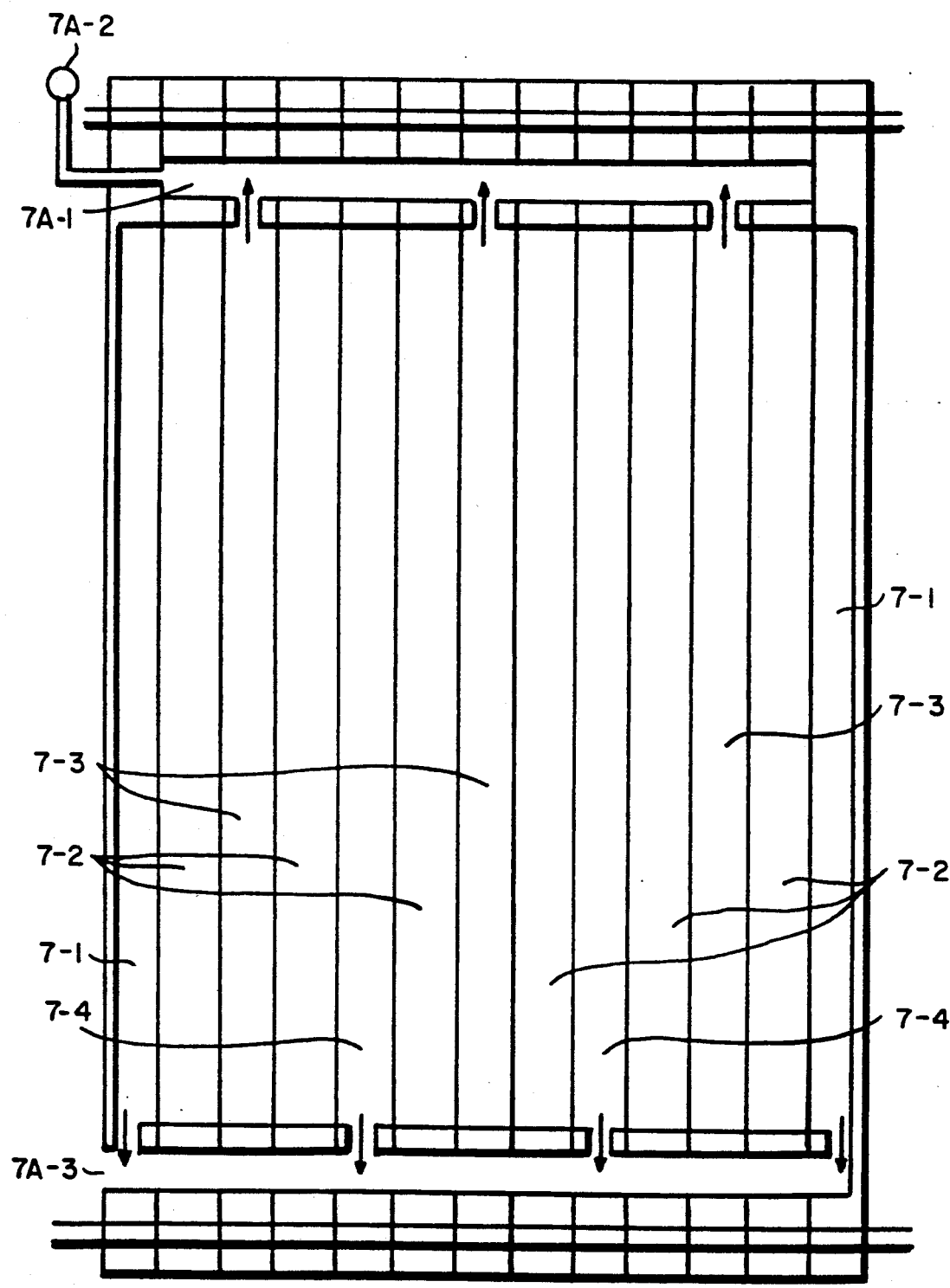
FIG. 7A (P.9)

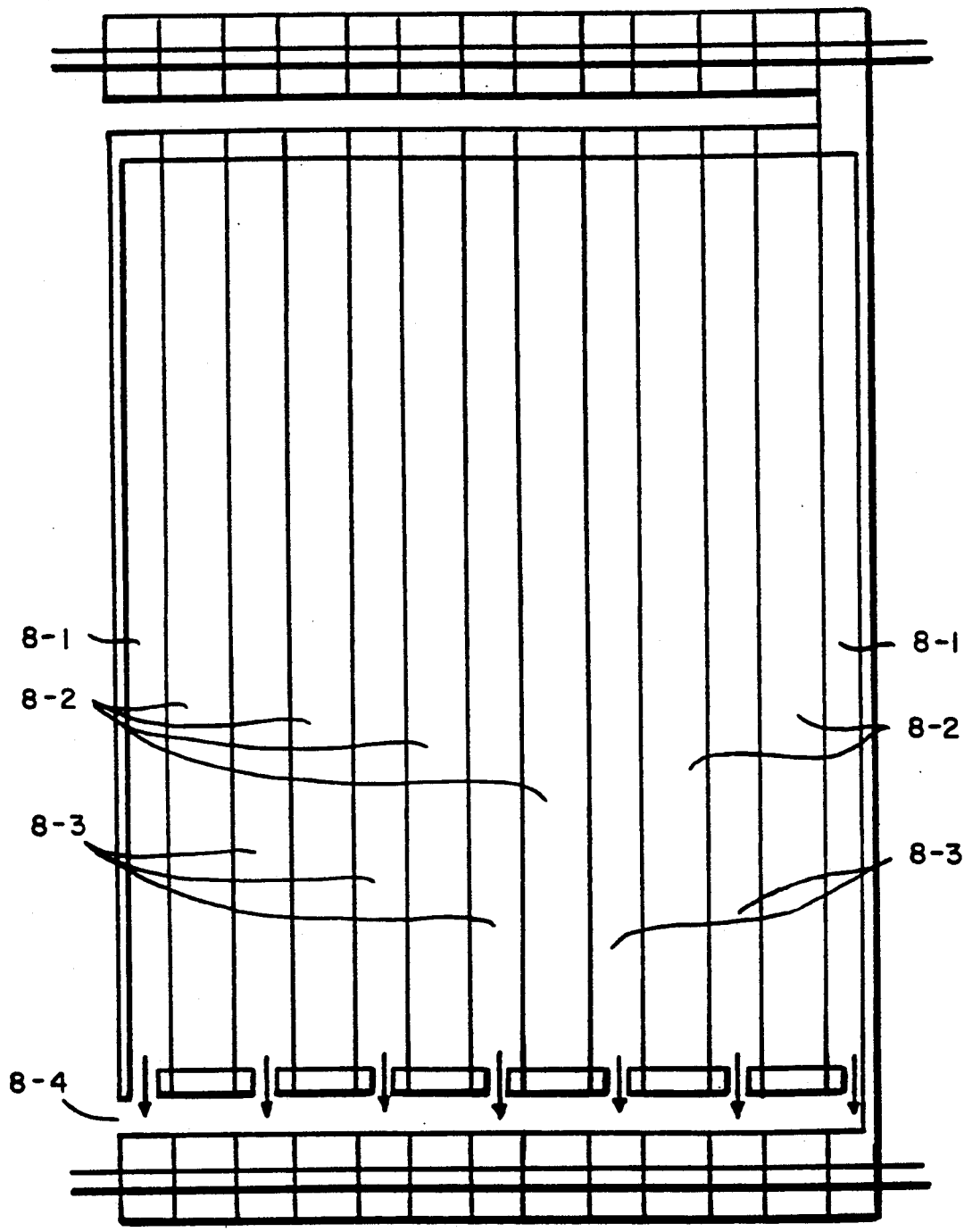
FIG. 8(P.9)

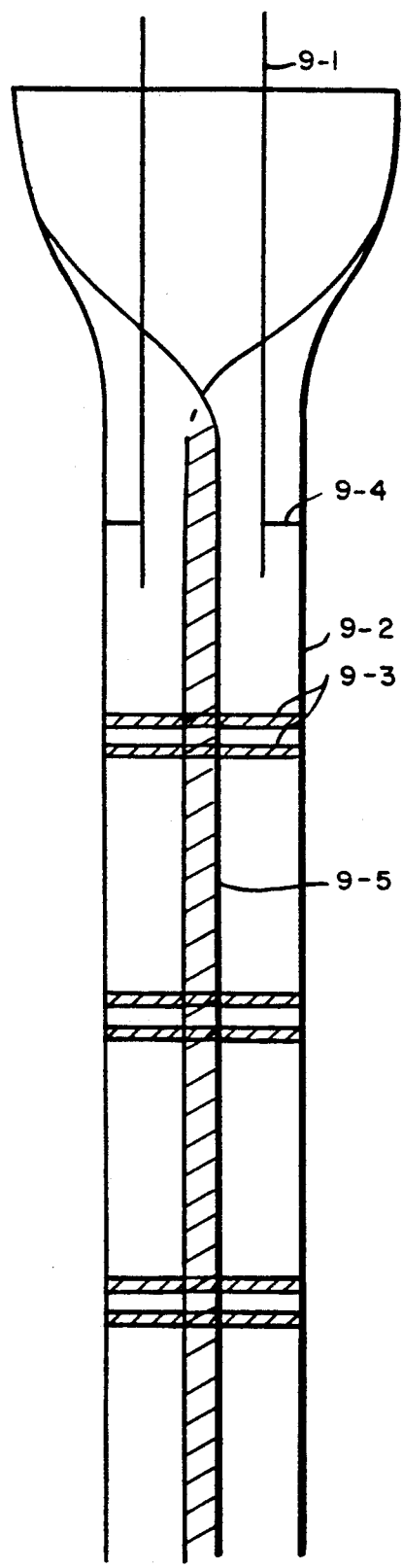
FIG. 9 (P.9)
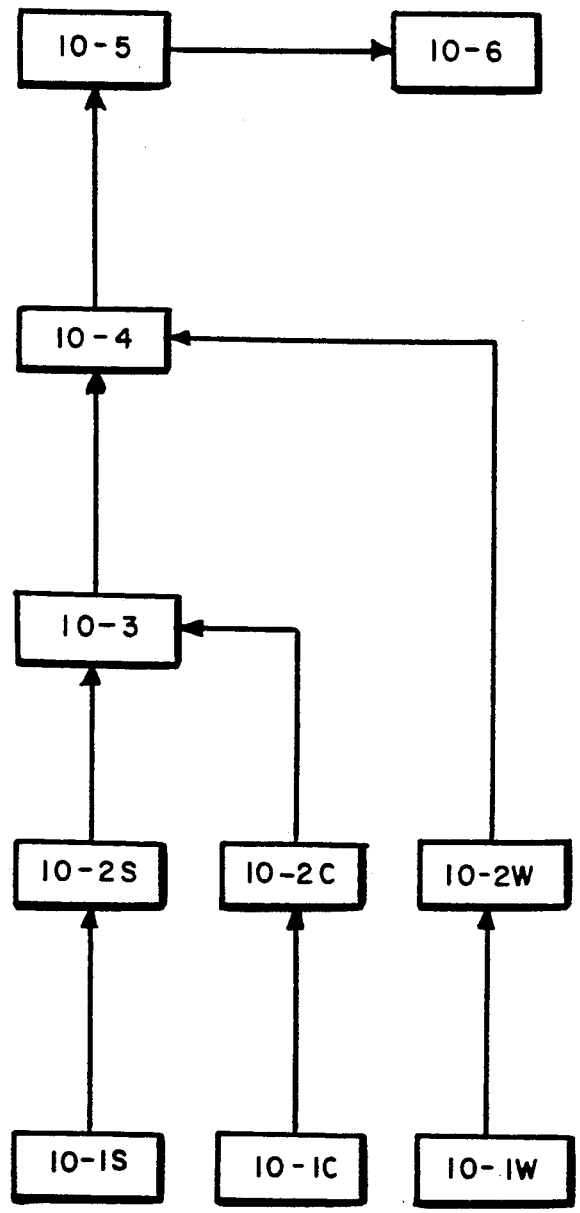
FIG. 10 (P.9)

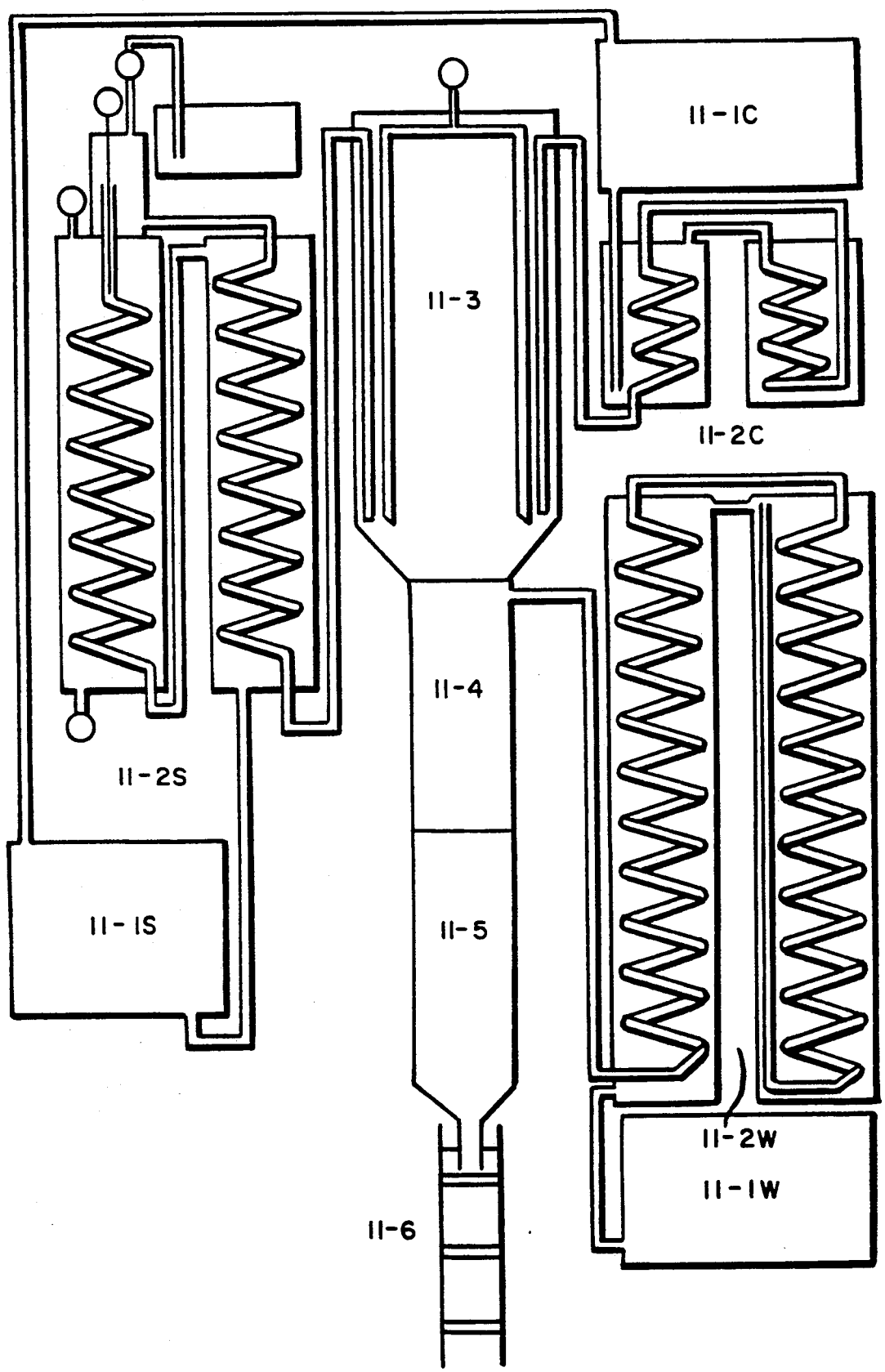
FIG. 11 (P.10)

CONTINUOUS METHOD OF TOFU PRODUCTION

This application is a continuation of Ser. No. 07/110,553, filed Oct. 19, 1987, now abandoned, which is a continuation of Ser. No. 06/771,362, filed Aug. 30, 1985, now abandoned.

SUMMARY OF THE INVENTION

I. These inventions belong to the following categories and steps:
1. A process that separates whey from tofu immediately after coagulation without any temperature lowering, so that the tofu product in this stage is a hot, viscous, homogeneous colloidal soybean curd paste. This hot soybean curd paste is the product of the continuous method of tofu production.
2. Six different kinds of necessary apparatus which can be used to achieve the continuous method of tofu production. These are:
   a. Compressor. Compressors of soymilk and coagulant are apparatuses devised to put them under equal pressure in order to control their rates of liquid flow into the coagulation chamber in an assigned proportion by controlling the openings of their respective valves.
   b. Sterilizer and cooler. This is an apparatus to sterilize soymilk, coagulant or washing water and cool them to the temperature of coagulation by fresh soymilk, coagulant or water respectively.
   c. Coagulator. This apparatus provides a means that unreacted reactants will always contact each other, that is soybean curds produced won't hinder the coagulation reaction which makes the coagulation reaction much better.
   d. Washer. This apparatus provides a method to wash freshly coagulated soybean curds to free the whey from within the atomic configurations of the soybean curd molecules (polymers). So that the tofu contains 85% water rather than traditional whey.
   e. Drainer. This apparatus provides a method to drain washing water from hot soybean curds thus eliminating the need of forming boxes and pressing machine. This makes the separation of whey from tofu continuous.
   f. The final sterile product tofu may be canned by a canning machine. A method of vacuum packaging tofu in a plastic bag is described.

II. The advantages of the continuous method of tofu production in comparison with the conventional method as described in Shurtleff, William and Aoyagi, Akiko, Tofu and Soymilk Production, The Book of Tofu, Volume II, A craft and Technical Manual, New-Age Foods Study Center, 1979 are that the equipments are improved and simplified and the conventional method requires much labor such as:
1. Cornell boiling water grind, because the beany flavor compounds are removed by hot water washing.
2. Large volume pressure cooker that cooks soymilk by batches.
3. Addition of a chemical to remove foam formed during soymilk cooking.
4. Large volume coagulation tank.
5. Skilled labor to add the coagulant, stir the mixture, and wait a long time for the completion of the coagulation reaction.
6. Labor to remove the supernatant whey from the coagulation tank.
7. Forming boxes and labor for gentle ladling of the soybean curds from the coagulation tank into the forming boxes.
8. Mechanical pressing equipment, and the labor to handle the forming boxes into this pressing equipment.
9. Filtercloth and labor to wrap the soybean curds with it.
10. Labor to open the wrapped filtercloth and remove tofu from the forming boxes into water.
11. Labor to cut tofu into small tofu cakes.
12. Labor to place the delicate tofu cakes one by one into the plastic water-filled-tub.
13. Labor to place the tofu water-filled-tub into the packaging machine.

III. Productions and applications.
1. The present invention produces a special kind of tofu, which the applicant refers to as American tofu, containing, while Chinese traditional tofu contains whey.
2. The present invention can be used to produce new kinds of solid mixed foods that contain vegetable and animal proteins in any proportion as designed by dietitian or nutritionist.
3. The present invention can be used to produce different shaped products.
4. The present invention can be used to renovate the methods of production of soymilk, silken tofu, frozen dried tofu, fermented tofu, and cheese making.

BACKGROUND

Tofu is a high vegetable based protein food free of cholesterol, low in saturated fats, and relatively low in calories. It is a useful food, especially for those watching their weight, concerned about heart problems or high blood pressure. It is prepared from soybeans. In 1979, Japan's largest tofu factories used 15 tons of American dry soybeans each day to produce 45 to 60 tons of tofu daily. The method of tofu production of the largest modern factories is still the traditional Chinese step-by-step batch process which has been used for thousands of years. The steps for making tofu as described in Shurtleff's book are as follows: (1) clean soybeans, (2) wash and soak, (3) drain, (4) grind, (5) extract, (6) cook soymilk, (7) coagulate, (8) remove supernatant whey from the coagulation tank, (9) scoop bean curds into forming box and wrap it with filtercloth, (10) press to remove whey, (11) unwrap the filtercloth and remove tofu from the forming box into water, (12) cut block tofu into small cakes, (13) cool, (14) pick up each tofu cake and put it into a plastic water-filled-tub, and (15) thermoseal.

Tofu contains 85% moisture and actually this moisture is whey. Whey is neither good to the taste nor to one's health. The plastic water-filled-tub package to tofu in the supermarket is awkward looking and even though it has been pasteurized, it still cannot be stored without refrigeration see Levton, Richard, "Spotlight: Retail", SOYFOOD. Because of its high protein content and moisture, tofu is a very good medium for microbes. It is very easily perishable. Even refrigerated, the shelf life of tofu is less than a week, and its freshness keeps only two or three days.

DETAILED DESCRIPTION OF THE DRAWINGS

FIG. 1 shows of the compressor. Tank 1-1 is a reservoir. A means of water level control mechanism 1-2 controls the feeding pump 1-3. A check valve 1-4 stops feed back. A safety valve 1-5, made to sense low pressures, is used as an air vent to relieve excess air during the feeding of the liquid into the reservoir. This is accomplished by setting a safety pressure P2 a bit higher than the air gauge 1-6 pressure P1 inside the reservoir. A reducing valve 1-7 introduces the air under constant pressure P1 into the reservoir from a compressed-air tank and this constant air pressure P1 presses the liquid to flow at a constant rate. A tube 1-8 connects two parallel reservoirs of soymilk and coagulant compressors to equalize air pressure between them. An outlet valve 1-9 and a flowmeter 1-10 are set at the bottom of the reservoir. A thermo-regulating system 1-11 adjusts the temperature of fresh soymilk to a constant temperature of Tf. Tf is determined experimentally through the use of a sterilizer and cooler, so that the temperature of the hot sterilized soymilk is lowered and automatically adjusted by the fresh soymilk in the cooler to precisely the temperature of coagulation. In other words, the value of the constant temperature of the fresh soymilk Tf is controlled by a thermocontroller disposed in the coagulator.

FIG. 2 shows the sterilizer and cooler using soymilk as an example. It is an assembly of a cylinder A 2-1, a coil 2-2, a cylinder B 2-3, and a coil 2-4 all connected in series. The cylinder A 2-1 acts as an hall way of cold fresh soymilk, and is arranged as a jacket of coil 2-4. Coil 2-2 is a heating coil or a sterilizer, cylinder B 2-3 a soymilk foam eliminator, and coil 2-4 a cooler to cool the hot sterilized soymilk to a temperature of coagulation. The cold fresh soymilk entering the cylinder A 2-1 cools the hot sterilized soymilk in coil 2-4. In the meantime, the cold fresh soymilk in cylinder A 2-1 is preheated by the hot sterilized soymilk in coil 2-4 and enters the heating coil 2-2. A cylinder C 2-5 is used as a jacket of coil 2-2 and is filled with pressured steam which sterilizes the preheated fresh soymilk in coil 2-2. An air vent 2-6 on the top of the cylinder B 2-3 vents the soymilk foam through a tube 2-7 to a water basin 2-8. A reducing valve 2-9 reduces boiler steam pressure to satisfy the temperature of sterilization. A pressure gauge 2-10 indicates the steam pressure. A steam trap 2-11 is a thermostatic valve which opens at temperatures equal to or below 212° F., in order to discharge air and steam condensate and closes at temperatures higher than 212° F. in order to trap steam. A wire coil spring 2-12 is inserted in the heating coil 2-2 and is rotated by a variable motor 2-13. A wire coil spring 2-14 encircles the cooling coil 2-4 and is rotated by a variable motor 2-15. A thermocontroller 2-16 is adjustably attached to the heating coil 2-2 to control the temperature of sterilization by operating a solenoid valve 2-17 at the outlet of coil 2-4.

FIG. 3 shows the coagulator. Cylinder 3-1 is used as a reaction chamber. An assembly 3-2 consists of two sets of M-shaped-perforated tubes 3-3, 3-4 which are arranged alternately and rotated by a variable motor 3-5. This assembly acts as a feeder feeds soymilk and coagulant separately into the side of the cylinder and as a stirrer stirs slowly along the side of the cylinder 3-1. The cylinder has a sampling outlet 3-6 and a discharge port 3-7. A thermocontroller 3-8 controls the constant temperature of fresh soymilk Tf in apparatus of soymilk compressor by regulating system 1-11 FIG. 1.

FIG. 3A is a vertical-sectional view of separated feeder and stirrer. A group of vertical perforated tubes 3A-1 evenly fixed along the wall of the cylinder, feeds soymilk along the side of the cylinder 3A-5. A second group of vertical perforated tubes 3A-2 evenly fixed along the wall of the cylinder, feed coagulant along the side of the cylinder 3A-5. A set of M-shaped-multiple-blades form stirrer 3A-3 which is mounted on the cap 3A-6, is rotated by a variable motor 3A-4, and stirs slowly and continuously along the side of the cylinder 3A-5.

FIG. 3B is a cross-sectional view of separated feeder and stirrer taken along line L-L in FIG. 3A.

FIG. 4 is a perspective view of the frame. The horizontal part, either the top or the bottom of the frame 4-1, is made of two thin metallic stripes 4-2 to provide a slit, which forms an entrance at the top or the exit at the bottom of passage 4-5. The vertical parts 4-3 of the frame are solid. A filter cloth 4-4 is surrounds around the frame and acts as two walls to form vertical narrow passage 4-5 with the two vertical parts 4-3 of the frame. In practice, the mixture of the coagulation products, including the loose lumpy soybean curds and the whey, flow downward, feed into the vertical narrow passage 4-5 and then form a vertical thin layer between these two walls of the filtercloths. Three holes 4-6, on each of the three corners of the frame, are provided to form channels in assembling. Four holes 4-7, one on each corner of the frame, are provided to hold fasteners for assembly.

FIG. 4A is a vertical-sectional view of the frame taken along line A—A in FIG. 4.

FIG. 4B is a cross-sectional view of the frame taken along line B—B in FIG. 4.

FIG. 5 is a perspective view of the empty plate. The four members 5-2 of the frame 5-1 are solid. Both sides of the frame 5-1 are fitted with perforated sheets 5-3. Three holes 5-6, on each of the three corners of the frame, are provided to form channels for assembly. Each empty plate has ducts 5-4 that connects to each of two top corner holes 5-6. Four holes 5-7, one on each corner of the frame, are provided to hold fasteners for assembly.

Figure 5A:
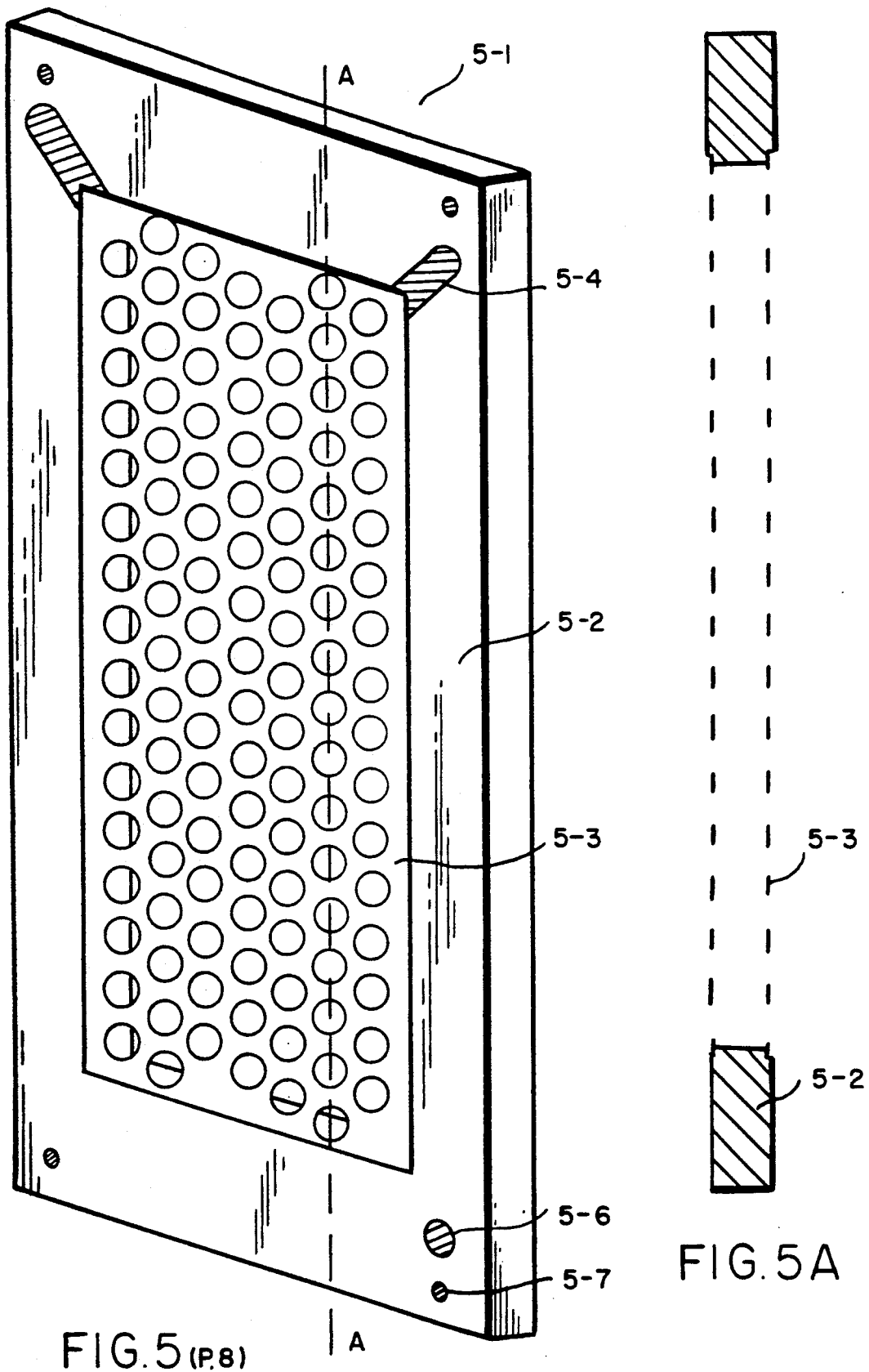

FIG. 5A is a vertical-sectional view taken along line A—A in FIG. 5.

FIG. 6 is a perspective view of the false plate. The four members 6-2 of the frame 6-1 are solid. The frame 6-1 is fitted with a hollow means 6-3. The said hollow means 6-3 is made of, for example, a layer of wire coil springs 6-3A coated with fine wire screens 6-3B on both sides. Three holes 6-6, on each of the three corners of the frame 6-1, are provided to form channels for assembly. Each false plate has a duct 6-4 that connects to only one hole 6-6 on the bottom. Four holes 6-7, one on each corner of the frame, are provided to hold fasteners for assembly.

Figure 6A:
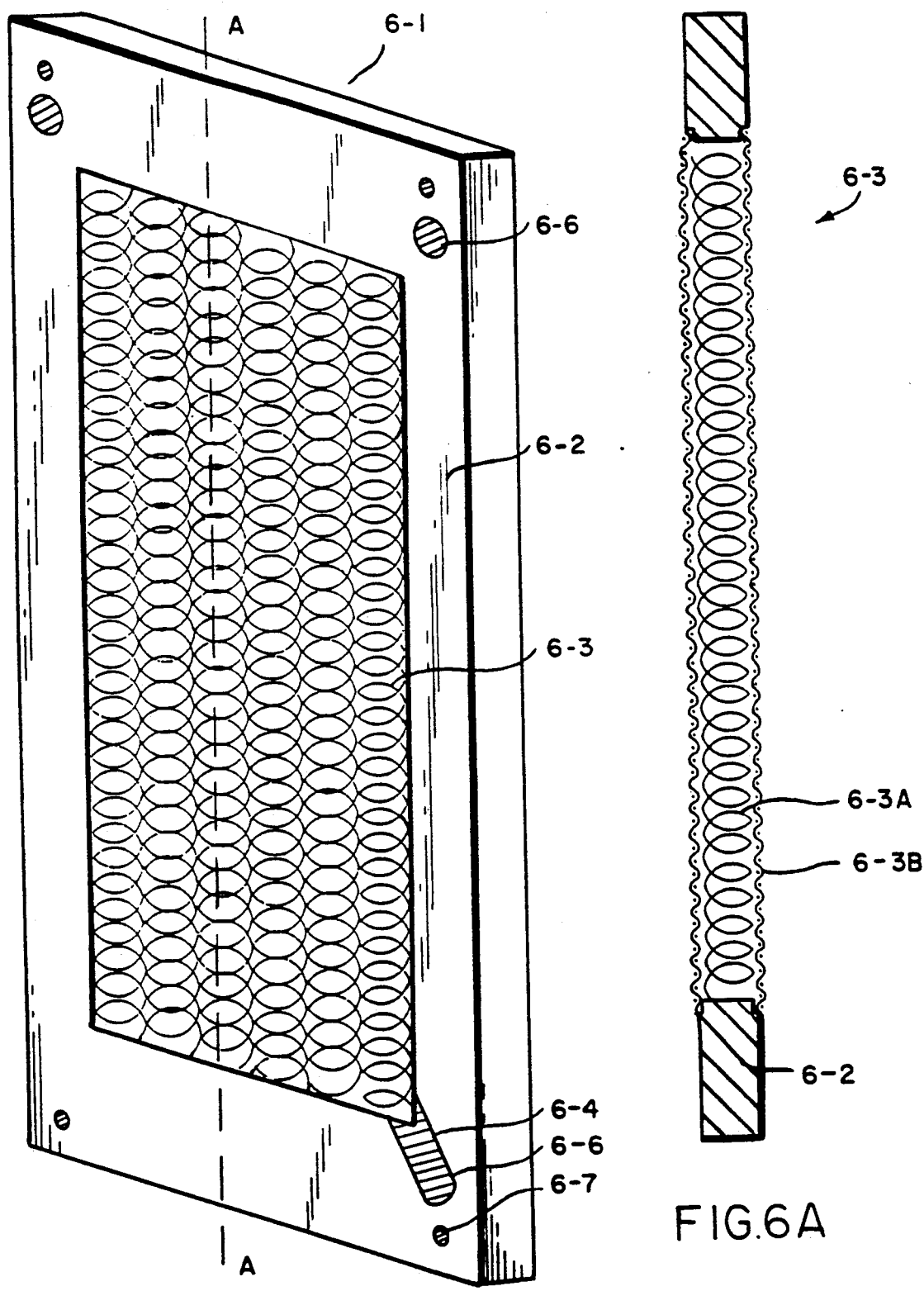

FIG. 6A is a vertical-sectional view of false plate taken along line A—A in FIG. 6. 6-3A is spring 6-3B is screen.

FIG. 7 is a vertical-sectional view of washer in the washing side. End false plate 7-1 empties washings. Within frame 7-2 flows the mixture of loose lumpy soybean curds and whey forming a vertical thin layer between two walls of filtercloths. Empty 7-3 stores water. False plate 7-4 empties washings. Channel 7-5 supplies water.

FIG. 7A is a vertical-sectional view of the washer in the draining side. Channel 7A-1 is disposed an air vent 7A-2 at the top to relieve air. Channel 7A-3 discharges washings.

FIG. 8 is a vertical-sectional view of the washer in the draining side. End false plate 8-1 empties drainage. Within frame 8-2 flows the mixture of soybean curds and water (where whey is displaced by water in washer) forming a vertical thin layer between two walls of filtercloths. False plate 8-3 empties drainage into channel 8-4 which discharges drainage.

FIG. 9 shows a method of vacuum packaging tofu in a plastic bag. The hot fluid tofu paste is fed continuously through feeder 9-1 into a continuous plastic tube 9-2. Thermoseal double seams 9-3 are formed underneath the surface of tofu paste 9-4 so that no air can be entrapped into the tofu bag, thus forming a vacuum package. One of these seams becomes the top of the filled bag, the another one becomes the bottom of the next bag. The continuous plastic tube 9-2, for example, is formed by thermosealing the overlapping of two edges 9-5 of the plastic sheet unrolled from a plastic sheet roll. (Or by thermosealing two edges of two packed strips of plastics sheets unrolled from two plastic sheet rolls. The resulting package of tofu now is a long chain of tofu bages resembling a chain of sausage. The tofu paste solidifies into the desired shape after cooling in a molding conveyer conveying into a water cooling tank. At the end of the molding conveyer the tofu chain is automatically cut between the double seams into tofu bags. These are not shown in FIG. 9.)

FIG. 10 is a flow chart of the continuous method of tofu production. 10-1S, 10-1C, and 10-1W are compressors of soymilk, coagulant, and water respectively; 10-2S, 10-2C, and 10-2W are sterilizers of soymilk, coagulant, and water respectively; 10-3 is coagulator; 10-4 is washer; 10-5 is drainer; and 10-6 is packager.

FIG. 11 show an apparatuses arrangement of the continuous method of tofu production. 11-1S, 11-1C, and 11-1W are compressors of soymilk, coagulant, and water resprctively; 11-2S, 11-2C, and 11-2W are sterilizers of soymilk, coagulant, and water respectively; 11-3 is coagulator; 11-4 is washer, 11-5 is drainer; and 11-6 is packager.

DETAILED DESCRIPTION OF THE INVENTION

I. The Process Invention

In all conventional tofu factories, the separation of whey from tofu is accomplished during the stage in which the tofu curd is in the nonsticky-jelly-form. The nonsticky-jelly-form means it will not stick together after being cut without compressing, and the whey will appear at the cut. Thus in the traditional method, the tofu will not stick to the filtercloth when it is pressed in the forming box in order to remove the whey. A similar case occurs during the production of cheese, in that cheese will not stick to the cheese cloth and pressed in a hoop to remove the whey. Clearly, a major disadvantage of this traditional method for separating the whey from the tofu stems from the fact that it must be done in step-by-step batch process.

During the coagulation process in the traditional method, the physical state of the soybean curd changes as the temperature is lowered. At the begining, the soybean curds formed from coagulation are floating loose lumps. During the processing the suspension gradually chages first into a sticky jelly substance, into a nonsticky jelly, followed by a semisolid, then a soft tofu and finally into discrete solid tofu. All the physical changes of state that the curd undergoes (which is supposed to be progressing polymerization) are continuous and irreversible. Whereas jelly, made of gelatin which is a kind of animal protein, is reversible and liquefy on heating.

This invention describes a process in which the separation of whey from tofu is done immediately after coagulation before any cooling. This is opposed to the traditional process in that it must wait the temperature lowering in order to form a nonsticky jelly soybean curd form. The separation of whey is carried out by means of a washer and a drainer. In this stage, after the whey is removed, the soybean curd is a viscous, colloidal, homogeneous fluid paste. It becomes tofu simply by cooling. This isolated fluid paste is the basis for the developement of the continuous method of tofu production.

II. The Compressor

A compressor is an apparatus which can provide a constant, yet variable flow of a liquid. Thus in tofu processing, soymilk and coagulant can be fed into the coagulation chamber separately and continuously with an assigned ratio. For a simple analogy, one can imagine under the same tap water pressure, two water faucets with their valves opened different amounts. The rate of water flow through them depends directly upon the openings of the valves. Now, if soymilk and coagulant are in separate compressors but under the same pressure, the ratio of their flow rates can be obtained simply by adjusting the relative openings of the valves of their respective compressors. This is the principle of this apparatus. A compressor is shown in FIG. 1.

III. The Sterilizer and Cooler

The following 8 items are closely related to this apparatus.

1. Sterilization. For the purpose of keeping longer shelf life, both the vegetable and the spore forms of the microorganisms should be killed by sterilization. Usually, if the temperature of sterilization is 250° F. it takes 15 minutes. The time duration of sterilization depends on temperature, the higher the temperature the faster the sterilization will be. It is best sterilized by an ultra-high-temperature UHT or high-temperature-short-time HTST method. For example, if the temperature is 300° F., the time required for sterilization is only a few seconds. After sterilization it should be kept free from further contamination by carrying out each of the following steps in an enclosed, aseptic condition. Thus the final tofu product, hermetically packaged in a metallic can or plastic bag, can be stored without refrigeration.

2. Homogenization of temperature in heating jacket. A copy of Chen, Lu-ao, "A Device for Air Evacuation form an Autoclave," Science vol. 133, no. 2939, pp. 488–490, Apr. 27, 1951 is provided for background. Air, dissolved in water, vaporizes on boiling and mixes with steam to form boiler steam. Therefore, boiler steam is a mixture of steam and air. When the boiler steam is cooled in the heating jacket by cold fresh soymilk, the steam of the boiler steam is condensed into water. Its volume shrinks from gaseous vapor 22400 cc. to liquid 18 cc. per 18 g (or a gram mole of water) and disappears as condensate and drained, while the air of the boiler steam remains unchanged. Air is heavier than steam by the ratio 29 g/22400 cc. to 18 g/22400 cc., where 29 g is the average gram molecular weight of air, 18 g is the gram molecular weight of steam, and 22400 cc. is the molar volume. So air sinks and accumulates in the lower part of the heating jacket. Air is further cooled by fresh soymilk and acts as an insulator, hindering the transfer of heat energy from steam to soymilk. The air should be removed. It can be removed by a specially devised Chen's steam trap disposed at the bottom of the heating jacket. The Chen's steam trap is a valve which opens at temperatures equal to or lower than 212° F. to discharge air and steam condensate, and closes at temperatures higher than 212° F. to trap steam. After air is removed the temperature of the heating jacket will be uniform and in turn will correspond to the temperature of the pressured steam found from the steam table.

3. Constancy of temperature of sterilization. A thermocontroller is provided to control the temperature of sterilization. If the temperature is too low for sterilization, the thermocontroller will close a solenoid valve in order to stop the flow of soymilk. This will prolong the cooking so that the temperature of the soymilk may rise and reach the temperature of sterilization again.

4. Time duration of sterilization. It is measured by the distance between the point of contact (which is adjustable) of the thermocontroller and the heating coil, and the exit of the heating coil according to the relation, time = distance/linear rate of soymilk flow.

5. Feeding. Soymilk and coagulant should always be fed simultaneously in order to keep the assigned proportion. The thermocontrollers of the sterilizers for the soymilk and the coagulant are connected in series. Therefore, if the temperature of either one of them is below the required temperature of sterilization, then both of their respective solenoid valves will be closed and consequently, the flow of soymilk and coagulant will cease. Otherwise, when both the soymilk and coagulant are perfectly sterilized they will flow simultaneously.

6. Soymilk foam. A method for eliminating foam from soymilk without the addition of a defoamer is given. Since the solubility of air in water decreases as temperature increases, air is insoluble in boiling water. The dissolved air evaporates during the cooking of the soymilk and forms a thick foam with soyproteins. The thickness of the foam depends upon the concentration of protein and the more diluted the protein solution the less the foam. Theoretically there is no foam in pure water. When the soymilk foam is delivered into water, the protein of the foam dissolves in water and the air in the foam is freed. The resultant dilute protein solution can then be recycled by adding during grinding, washing the okara, diluting the slurry before extraction, or in diluting the extracted soymilk before cooking.

7. Scale: prevention of scale formation. A wire coil spring, resembling a plumber's snake to clean a drain pipe, is inserted in the heating coil and rotated slowly and continuously by a variable motor. It not only scrapes the inner wall of the coil to prevent soymilk from burning onto the inner wall of the heating coil but also stirs the cooking soymilk and improves the uniformity of soymilk flow in the heating coil. Due to the viscous nature of the liquid, the rate of flow is inherently faster in the center of the tube and slower along the side of the tube.

8. Cooling of sterilized soymilk. In my invention, the cooling of the hot sterilized soymilk (e.g. 300° F.) to a temperature of coagulation (e.g. 185° F.) by the cold fresh soymilk only. Of these three temperatures, sterilization Ts, coagulation Tc, and the cold fresh soymilk Tf, the former two (Ts, Tc) are always assigned and fixed in a tofu factory and only the last one Tf is variable. If the diameters and lengths of the heating coil and the cooling coil are equal, the relation among them should be Tc = (Ts + Tf)/2. For example, if two equal quantities of 300° F. and 70° F. soymilk are put together, the resultant temperature of the soymilk mixture will be 185° F. Since the rate of heat-energy transfer from liquid through the wall of a coil is not instantaneous, actually the resultant temperature of the sterilized soymilk will always be cooled to a temperature higher than 185° F. and the fresh soymilk will always be preheated to lower than 185° F. In order to obtain a constant value Tc = 185° F. either the temperature of fresh soymilk Tf should be much lower than 70° F. or the length of the cooling coil should be much longer than that of the heating coil. The value of Tf depends upon the specification of the sterilizer and cooler which can be determined experimentally. The fresh soymilk in the soymilk compressor should be regulated to the constant temperature Tf. A sterilizer and cooler is shown in FIG. 2.

IV. The coagulator

Tofu is a polymer, supposed to be soyprotein-M-polymer, where M represents bivalent metallic atoms such as $Ca^{++}$, $Mg^{++}$. Tofu has a molecular weight of about 360,000N, where 360,000 is the average molecular weight of soyprotein, N is the number of soyprotein molecules. When the coagulation reaction takes place at a very slow circular agitation with a stirrer along the side of the cylindrical reaction chamber, all the components including the tofu polymers, the whey, the unreacted soymilk and coagulant will be whirling. According to Newton's law of motion, f = m.a, when the stirrer applies a force (f), the tofu polymers which have very much greater molecular weight (m), will gain a very much smaller acceleration (a), will move very much slowly and lag behind the stirrer, and will gather and settle into the center of the cylinder. On the other hand, the whey, including the unreacted soymilk and coagulant, which have very much smaller molecular weight (m), at least N times less, than those of the tofu polymers, will gain a much greater acceleration (a), and keep in motion with the stirrer to form a thick liquid layer of whey zone along the side of the cylinder. The liquid whey zone is a solution of the unreacted soymilk, coagulant, and any water soluble substances from soybeans. According to this principle, a coagulator is devised with a device of combined feeder and stirrer to feed soymilk and coagulant separately and continuously into the side of the cylinder, and to stir slowly and continuously into the side of the cylinder. So that the soybean lumpy curds formed will gather and settle into the center, and the whey will rotate and form a liquid zone along the side of the cylinder. The soymilk and the coagulant which are directly fed into the liquid whey zone, are diluted by the whey. The coagulation reaction, as any chemical reactions, will take place completely and perfectly under diluted condition. The device of combined feeder and stirrer, for the simplicity of mechanical construction, can be separated into two parts: (1) a feeder comprises two sets of multiple-vertical-perforated tubes which are disposed alternately along the wall of the cylinder, feed soymilk and coagulant separately into and along the side of the cylinder; (2) a stirrer is a set of M-shaped-multiple-blades stirrer which is mounted on the cap and rotated by a variable motor, stirs slowly and continuously along the side of the cylinder. The feeder and the stirrer move relatively in opposite directions with each other, provide a shearing action in stirring. A sketch of the coagulator is shown in FIG. 3, FIG. 3A and FIG. 3B.

V. The Washer

The average constituents of soybean are 40% protein and 20% oil. By soaking, grinding, extracting, and cooking, they form an emulsion known as soymilk. By adding a coagulant, soymilk is separated into two parts, the tofu curd (solid) and the whey (liquid). Tofu is prepared by wrapping the mixture of tofu curd and whey with filtercloth and pressing in a forming box to remove the whey. By analysis, tofu (solid) contains 85% moisture in the form of whey. The whey is a solution of excess coagulant and soluble constituents of soybeans, including soybean trypsin inhibitors, STI, which can inhibit growth in monogastric animals oligosaccharide, a source of flatulince, and sources of disagreeable flavors. There are plenty of research worked by scientists about how to remove these from tofu.

A further subject of the invention is a washer to remove undesirable constituents in the whey from tofu. The mechanism of the washer is the pressing of water perpendicularly through a vertical thin layer of a mixture of loose lumpy soybean curds and whey which were bound by two parallel pieces of filtercloths. The water possesses a pressure P3 supplied from the compressor of water, and P3 is greater than the pressure P1 of soymilk supplied from the compressor of soymilk. So that in the washer, the water passes initially into the first piece of filtercloths, secondly through the thin vertical layer of mixture of loose lumpy soybean curds and whey, thirdly out of the second piece of the filtercloth, thus removing the whey, leaving water to occupy the space formerly occupied by the whey. This principle of washing is not ordinary dilution, it is a displacement of the whey by water. This is analogous to washing a precipitate on a cindered glass filter with a suction bottle in a chemical laboratory. It is the most efficient way of washing.

The washer is an assembly of a number of rectangular (a) frames, (b) empty plates, and (c) false plates. The function of a frame is to provide a means to bind a vertical thin layer of a mixture of soybean curds and whey with filtercloths. A sketch of the frame is shown in FIG. 4. The function of an empty plate is to provide a very large area to supply water, that is to form a very large water front (cross-section) of a water flow, and an ample space to store water. An empty plate is shown in FIG. 5. (c) The function of the false plate is to support two large areas of filtercloth, to receive washings or drainage from these two filtercloths, and to provide an ample space to empty the washings or drainage easily. A false plate is shown in FIG. 6.

The washer is assembled as follows:
1. All frames and plates are arranged alternately.
2. All empty plates and false plates are arranged alternately.
3. All ducts of empty plates are arranged on the top.
4. All ducts of false plates are arranged on the bottom and on the same side.
5. One channel at the top supplies water and the other channel at the top is disposed an air vent to relieve air.

A washer is shown in FIG. 7 and FIG. 7A.

VI. The Drainer

When a precipitate is dried in a chemical laboratory, it is usually spread out between two pieces of filter paper and pressed into a very thin layer to get the greatest contact with the filter paper. The same principle is applied to the drainer so that the drainer provides maximum area of drainage relative to the volume of material to be drained. It is similar to the washer. A mixture of lumpy soybean curds and water (where the whey has been displaced by water in washer) flows downward through a narrow passage of the frame to form a vertical thin layer. Two walls, with filtercloth on both sides of the frames, of the narrow passage provide the maximum area of drainage relative to the volume of the narrow passage of the mixture of soybean curds and water to be drained.

The drainer is an assembly of frames and false plates according to the following rules.
1. All frames and false plates are arranged alternately.
2. All ducts of the false plates are arranged on the bottom and on the same side.

A drainer is shown in FIG. 8.

VII. A Vacuum Packager

The hot pure fluid tofu paste can be hermetically packaged in a metallic can by a canning machine. A method of vacuum packaging tofu in a plastic bag is shown in FIG. 9.

The continuous method of tofu production is accomplished by assembling these apparatuses. The assembly is shown in FIG. 10 and FIG. 11.

The operations of this continuous method of tofu production are as follows:
1. Find the temperature of fresh soymilk that will cool the hot sterilized soymilk just to a temperature of coagulation. Set this temperature to be the regulated constant temperature of the fresh soymilk Tf in the compressor of soymilk.
2. Find the volumes ratio between the soymilk and coagulant to obtain an ideal coagulation reaction.
3. Adjust the rates of flow carefully by turning valves of compressors of soymilk and coagulant to agree to the data found in the step (2) and turn on the valve of the compressor of water.
4. Then turn on the steam to sterilizers and the continuous process is thus started.

APPLICATIONS OF THE INVENTION

I. Use the hot fluid tofu paste produced, with special molding techniques to produce different kinds (shape) of tofu products, such as tofu pills, tofu balls, tofu noodles, tofu fibers, tofu bars, tofu sticks, tofu sheets, etc.

II. Use the hot fluid tofu paste produced by the invention, as a binder to produce a solid mixed food of vegetable and animal proteins. The proportion of them is prepared according to a prescription of a dietitian or nutritionist. The said solid mixed food is made by using hot fluid vegetable protein tofu to bind the chopped solid animal protein foods such as: beef, pork, fish, chicken, etc. Or use hot tofu paste as binder to produce tofu burgers with chopped vegetables, fruits, seeds, nuts, etc. for vegetarians.

III. Use the apparatuses to renovate the method of production of products such as high quality soymilk, silken tofu, dried frozen tofu, fermented tofu, cow cheese making, soybean protein products, or to produce lactose free cow milk for lactose intolerant people.

I claim:

1. A method of tofu production, comprising steps of:
   (a) simultaneously feeding soymilk and an aqueous coagulant solution into a coagulator vessel whereby a substantially constant proportion of the soymilk and coagulant solution are added to the vessel;
   (b) coagulating the soymilk and aqueous coagulant solution at an elevated temperature to obtain a gelatinous mixture comprising soybean curd lumps and whey;
   (c) prior to substantial cooling of the gelatinous mixture after coagulation, separating at least a portion of the whey from the gelatinous mixture.

2. The process according to claim 1 where the soymilk and the coagulant solution are fed at a temperature suitable for coagulation.

3. The process according to claim 1 where the whey is separated from the gelatinous material immediately after coagulation.

4. The process of claim 1 where the whey is separated by washing the gelatinous material with water.

5. The method of claim 1 used for the production of tofu comprising about 85 percent water.

6. A process according to claim 1 further comprising the step of sterilizing said soymilk and aqueous coagulant solution.

7. The process of claim 1 wherein said process is carried out aseptically.

8. The process of claim 1 wherein said process is carried out continuously.

9. The process of claim 1 further comprising the step of defoaming said sterilized soymilk prior to feeding.

* * * * *

UNITED STATES PATENT AND TRADEMARK OFFICE
CERTIFICATE OF CORRECTION

PATENT NO. : 5,094,875
DATED : March 10, 1992
INVENTOR(S) : Lu-ao Chen

It is certified that error appears in the above-indentified patent and that said Letters Patent is hereby corrected as shown below:

On the title page, Item:

[76] Inventor: Lu-ao Chen, 108 Crescent St., Auburndale, Mass. 02166

Signed and Sealed this

Twenty-sixth Day of October, 1993

Attest:

BRUCE LEHMAN

*Attesting Officer*   *Commissioner of Patents and Trademarks*